(12) United States Patent
Arai et al.

(10) Patent No.: US 8,051,367 B2
(45) Date of Patent: Nov. 1, 2011

(54) STORAGE SUB-SYSTEM AND METHOD FOR CONTROLLING THE SAME

(75) Inventors: Masahiro Arai, Machida (JP); Kentaro Shimada, Tokyo (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 946 days.

(21) Appl. No.: 12/010,851

(22) Filed: Jan. 30, 2008

(65) Prior Publication Data

US 2009/0083610 A1    Mar. 26, 2009

(30) Foreign Application Priority Data

Sep. 26, 2007  (JP) ................ 2007-250139

(51) Int. Cl.
G06F 11/10 (2006.01)
H03M 13/00 (2006.01)
(52) U.S. Cl. .............. 714/807; 711/114; 719/325
(58) Field of Classification Search ........... 714/6.22, 714/807; 711/114; 719/325
See application file for complete search history.

(56) References Cited

U.S. PATENT DOCUMENTS

| 6,098,190 | A * | 8/2000 | Rust et al. ............ 714/763 |
| 6,928,526 | B1 | 8/2005 | Zhu et al. |
| 7,293,139 | B2 * | 11/2007 | Nishimoto et al. ........ 711/114 |
| 2006/0026345 | A1 | 2/2006 | Nishimoto et al. |
| 2006/0136777 | A1 * | 6/2006 | Terashita et al. .......... 714/6 |
| 2009/0006863 | A1 * | 1/2009 | Mizuno ................ 713/190 |

FOREIGN PATENT DOCUMENTS

| JP | 2000-347815 | 6/1999 |
| JP | 2001-202295 | 1/2000 |
| WO | 2007/089502 A1 | 8/2007 |

OTHER PUBLICATIONS

David A. Patterson et al., "A Case for Redundant Arrays of Inexpensive Disks (RAID)", Proceedings of the ACM SIGMOD International Conference on Management of Data (Jun. 1988), pp. 3-14.

* cited by examiner

*Primary Examiner* — Sam Rizk
(74) *Attorney, Agent, or Firm* — Volpe and Koenig, P.C.

(57) ABSTRACT

The present invention provides means for effectively reducing the amount of data by means of de-duplication in a disk array apparatus having a data guarantee code.

A control means for the disk array apparatus that adds a data guarantee code to each logical data block and checks the data guarantee code when reading data has a de-duplication performing function and control means for: generating LA substitution information for a function checking the data guarantee code or read data location address substitution information when performing the de-duplication and storing data; performing the de-duplication using the above-mentioned information when reading data; and thereby avoiding false diagnosis of the data guarantee code check.

9 Claims, 18 Drawing Sheets

FIG.6

UNALLOCATED POOL AREA
MANAGEMENT LIST                T4

| BLOCK LA |
|----------|
| LA of D5 |
| LA of D10 |
| LA of D8 |
| LA of D20 |
| ... |

FIG.7

ALLOCATED POOL AREA MANAGEMENT LIST    T5

| BLOCK LA | REFERENCE COUNT |
|----------|-----------------|
| LA of D1 | 2 |
| LA of D2 | 1 |
| LA of D3 | 10 |
| LA of D4 | 5 |
| ... | |

FIG.8

LA SUBSTITUTION TABLE  T6

| ORIGINAL LA | SUBSTITUTED LA |
|---|---|
| LUN10:LBA88590B | LUN90:LBA343562 |
| LUN10:LBA367AC0 | LUN90:LBA343562 |
| LUN10:LBA564332 | LUN90:LBA343594 |

FIG.9

HASH TABLE  T7,T8

| HASH VALUE | BLOCK LA |
|---|---|
| 603AB32353 | LUN90:LBA343562 |
| 603AC38170 | LUN90:LBA343578 |
| 603AC43521 | LUN90:LBA343594 |
| ... | ... |

FIG.16

ACCESS REDIRECTION LIST

REPRESENTATIVE VIRTUAL BLOCKS | ORIGINAL ELEMENTS

VIRTUAL-BLOCK-TO-REAL-BLOCK TRANSLATION TABLE T11

| LA OF REPRESENTATIVE VIRTUAL BLOCK | LA OF REAL BLOCK |
|---|---|
| LA of B1 | LA of D1 |
| LA of B5 | LA of D2 |
| LA of B10 | LA of D3 |
| ... | ... |

STORAGE SUB-SYSTEM AND METHOD FOR CONTROLLING THE SAME

CROSS-REFERENCES TO RELATED APPLICATIONS

This application relates to and claims priority from Japanese Patent Application No. 2007-250139, filed on Sep. 26, 2007, the entire disclosure of which is incorporated herein by reference.

BACKGROUND

1. Field of the Invention

The invention relates to a storage sub-system having a data de-duplication function and a method for controlling the storage sub-system.

2. Description of Related Art

A disk array apparatus storage sub-system is configured so that a plurality of magnetic disks or semiconductor disks such as SSD (Solid State Disks) using nonvolatile memory or similar are arranged in arrays and placed under control of a disk array controller. The disk array apparatus processes at high speed a read request (data read request) and a write request (data write request) from host computers by operating a plurality of disks in parallel.

Many disk array apparatuses employ a data redundancy technique called "RAID (Redundant Arrays of Inexpensive Disks)" in order to prevent data loss due to a disk failure (for example, see "A Case for Redundant Arrays of Inexpensive Disks (RAID)," David A. Patterson, Garth Gibson, and Randy H. Katz, Computer Science Division Department of Electrical Engineering and Computer Sciences, University of California, Berkeley). RAID effectively functions when a specific disk or a specific sector breaks down and a failure in reading data from the disk occurs.

However, if there is no such a mechanical failure and the disk array controller can read data from disks, but if there is a failure like in the case where the data is not written at a correct address in the disk due to trouble or the data being garbled, RAID cannot deal with such a failure.

In order to deal with such a data failure, an attempt is being made in some disk array apparatuses by adding redundant information called a "data guarantee code," based on the attributes of the relevant data block, to that data block in response to a write request from a host computer to logical volumes, storing the data block with the data guarantee code on the disk, and checking the data guarantee code, which is the redundant information, when reading the data.

For example, Japanese Patent Laid-Open (Kokai) Publication No. 2000-347815 discloses a method for adding a logical address (LA) for a data block as a data guarantee code to the content of the data. Japanese Patent Laid-Open (Kokai) Publication No. 2001-202295 discloses a form in which LA/LRC (LA and LRC [Longitudinal Redundancy Check]) is added as a data guarantee code.

On the other hand, a control technique of eliminating data duplication, called "data de-duplication" is known as a technique of reducing the amount of data stored on disks. De-duplication is a method for reducing the total amount of data stored on disks—if the content of a data block written by a host computer is the same as the content of a data block previously stored at a different location in the disks—by not writing the duplicate data to the disks, but just recording it in a table or a database so that reference will be made to the address where the data of the same content is stored.

For example, U.S. Pat. No. 6,928,526 discloses a data storage method wherein a module for checking whether the relevant data has already been stored or not is provided; and if the already stored data and the data to be stored are the same, the module returns the ID of the relevant block to upper control module.

The aforementioned data check technique using the data guarantee code and the data reduction control technique called "data de-duplication" are two different techniques, and no attempt has been made to combine these two techniques. After thorough examination, the inventors of the present invention have found that a simple combination of the above two techniques will bring about the following problems.

Assuming that there are two pieces of data, A and B, to be written by a host computer to different logical addresses in logical volumes and the content of the data is the same, de-duplication is to store only data A on disks without storing data B on the disks and read data B as a pointer for data A. As a result, if the host computer makes a request to read data B, a disk array controller refers to data A.

When the host computer makes a read request, a disk array apparatus that utilizes a data guarantee code checks, using the data guarantee code, whether or not the relevant data was read from the correct position on the disks. When the host computer makes a request to read data B, the disk array controller will try to check, using the data guarantee code, whether data B was properly read from the logical address corresponding to data B in response to the read request.

Because of de-duplication, the disk array controller refers to data A in response to the read request for data B. Therefore, the data guarantee code for the read data is based on the logical address of data A. However, since the disk array controller performs checking with the expectation to find the data guarantee code corresponding to data B, it determines that the check results in a data guarantee code check error. Therefore, the data check technique using the data guarantee code and the data reduction control technique called "data de-duplication" cannot be combined in the situation described above.

Thus, the de-duplication may be performed only if the entire content of both data A and data B, including not only the content of the data itself, but also the content of the data guarantee codes, is the same.

However, since the data guarantee code is a value unique to a data block, such as an LA, there is a very low possibility that a plurality of data whose entire content is redundant may exist. Therefore, the above-described method will hardly benefit from de-duplication in reducing the total amount of data as long as the disk array apparatus utilizes the data check technique using the data guarantee code.

SUMMARY

It is an object of the present invention to provide a storage sub-system that can utilize a data check technique using a data guarantee code and that has a function reducing the amount of data by means of de-duplication, and to also provide a method for controlling such a storage sub-system.

A storage sub-system configured to add a data guarantee code to each data block is provided according to an aspect of the invention in order to achieve the above-described object. The storage sub-system is characterized by a de-duplication function and its configuration for generating LA substitution information for data guarantee code checking, or read data location address substitution information when performing the de-duplication function and storing the data in logical volumes; redirecting information using the above-mentioned information when reading the data; and generating the data guarantee code based on the substituted information, thereby avoiding an error when checking the data guarantee code.

The present invention can provide a storage sub-system that can utilize a data check technique using a data guarantee code and has a function reducing the amount of data by means of de-duplication; and the invention can also provide a method for controlling such a storage sub-system.

Other aspects and advantages of the invention will be apparent from the following description and the appended claims.

BRIEF DESCRIPTION OF THE DRAWINGS

FIG. 6 is an explanatory diagram of an unallocated pool area management list according to the first embodiment.

FIG. 7 is an explanatory diagram of an allocated pool area management list according to the first embodiment.

FIG. 8 is an explanatory diagram of an LA substitution table according to the first embodiment.

FIG. 9 is an explanatory diagram of a hash table according to the first embodiment.

FIG. 16 is an explanatory diagram of an access redirection list according to the second embodiment.

FIG. 17 is an explanatory diagram of a virtual-block-to-real-block translation table according to the second embodiment.

FIG. 18-1 is the first half of a flowchart illustrating steps in processing executed by the de-duplication control program 1915 in response to a write request from the host computer according to the second embodiment.

FIG. 18-2 is the second half of the flowchart illustrating steps in processing executed by the de-duplication control program 1915 in response to a write request from the host computer according to the second embodiment.

DETAILED DESCRIPTION OF PREFERRED EMBODIMENTS

Figure 1:
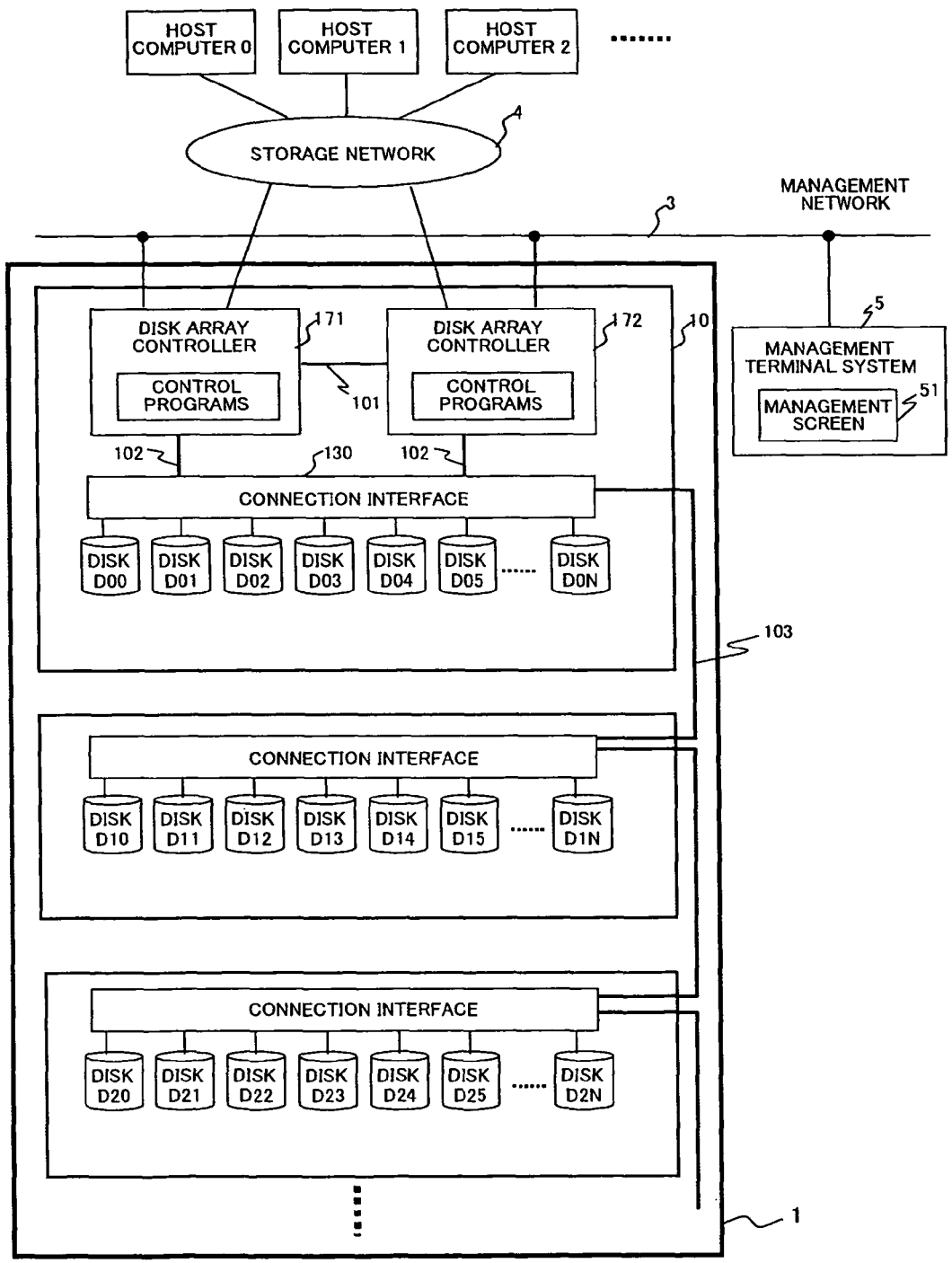
FIG. 1 shows the configuration of a disk array apparatus according to the present invention.

Embodiments of the present invention will be described below with reference to the attached drawings. FIG. 1 shows the configuration of a disk array apparatus according to the invention. A disk array apparatus 1 is connected via a management network 3 to a management terminal system 5. The disk array apparatus 1 is connected via a storage network 4 to a plurality of host computers 2.

The disk array apparatus 1 is equipped with disk array controllers 171, 172, so that the disk array apparatus 1 can input and output much data to and from the storage network at the same time. There may be one disk array controller or three or more disk array controllers, depending on the embodiment. Also, the disk array controller may be divided into a plurality of units for each function or component. The disk array apparatus 1 has a plurality of disk drives (hereinafter simply referred to as "disks") D00, D01, D02, and so on up to D2N.

The disk array controllers 171, 172 are connected via connection interfaces 130 and a signal line 103 connecting the connection interfaces 130 to the disks D00 to D2N. As a result, the disk array controllers 171,172 and the disks D00 to D2N can input or output data to or from each other. The disk array controllers 171, 172 and the disks D00 to D2N are connected using channels appropriate for data transfer, such as SATA (Serial ATA), SAS (Serial Attached SCSI), or Fibre Channel.

Control programs operate in the disk array controller 171 and other disk array controllers to control data input to and output from the disk D00 and other disks. The disk array controller 171 and other disk array controllers manage the RAID configuration composed of the disk D00 and other disks, as well as logical volumes formed in the RAID configuration. Also, the disk array controller 171 and other disk array controllers communicate with the management terminal system 5 and exchange various kinds of data necessary for the setup, management, and maintenance of the disk array apparatus 1.

The disk D00 and other disks are disks that can be connected via, for example, SATA, SAS, or Fibre Channel, and examples of media used for the disks include magnetic disks and semiconductor disks using nonvolatile memory.

The management terminal system 5 is a computer device equipped with a CPU, memory, storage devices, interfaces, input devices, and display devices. Management programs operate in the management terminal system 5 to monitor the operating state of the disk array apparatus 1 and control the operation of the disk array apparatus 1. Incidentally, client programs such as a web browser may operate in the management terminal system 5, and management programs (such as Common Gateway Interface and Java (registered trademark)) supplied from the disk array apparatus 1 may be used to monitor the operating state of the disk array apparatus 1 and control the operation of the disk array apparatus 1. A display screen 51 is the screen of a display device included in the management terminal system 5.

The host computer 2 is a computer device equipped with a CPU, memory, storage devices, and interfaces and makes data services and web services available, using data supplied from the disk array apparatus.

The storage network 4 is a network capable of conducting communications according to protocols suitable for data transfer, such as SAS protocol, Fibre Channel protocol, or iSCSI protocol.

The management network 3 is capable of communicating data and control information between computers according to, for example, TCP/IP protocol. An example of the management network 3 is Ethernet (registered trademark).

Figure 2:
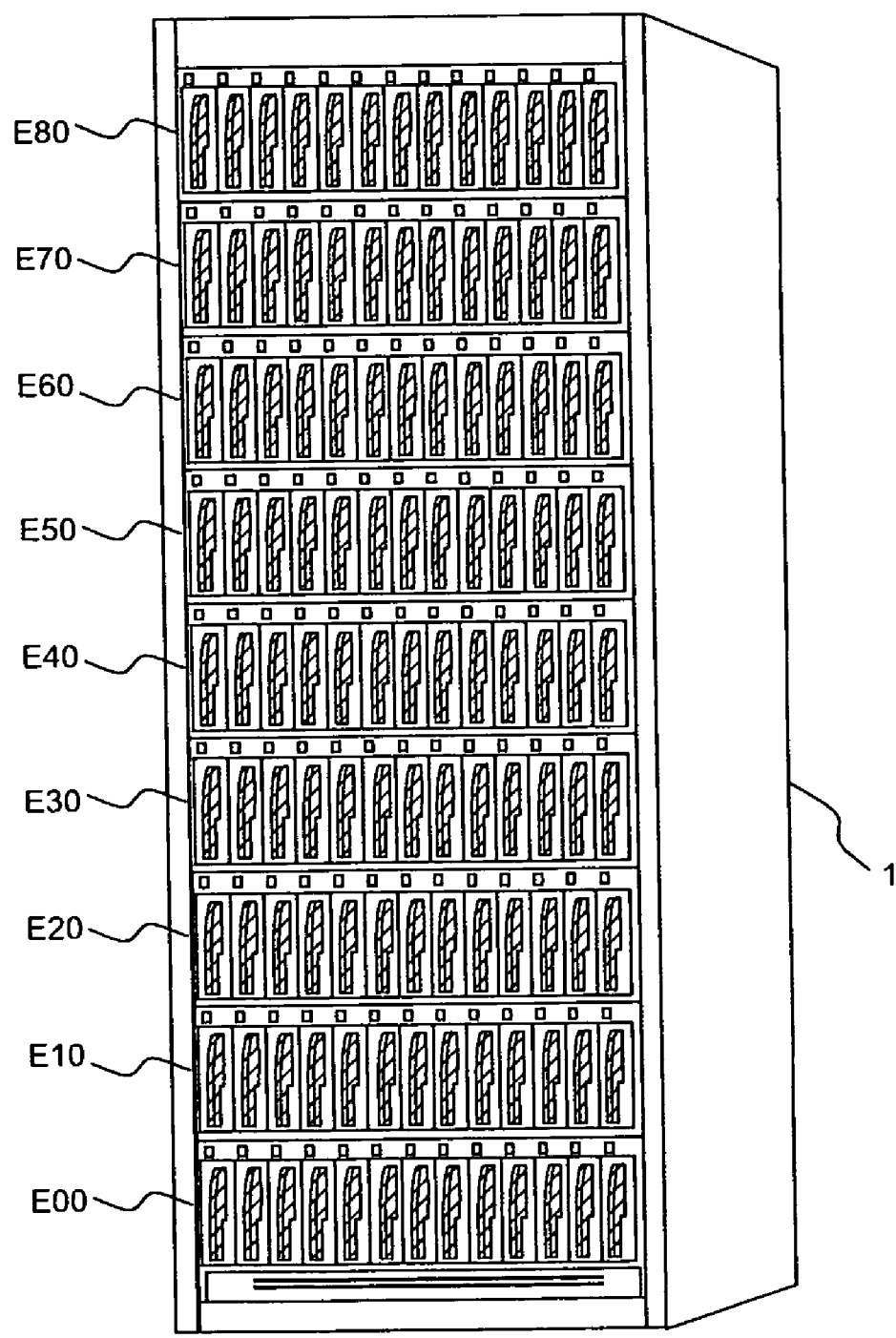
FIG. 2 is an external view of the disk array apparatus according to a first embodiment of the invention.

FIG. 2 is an external view showing the configuration of a disk array apparatus according to the first embodiment. The disk array apparatus 1 contains the disk array controller 171 and other disk array controllers, the disk D00 and other disks, fans, and a power source 8; and the disk array apparatus 1 is configured by connecting a plurality of housings such as disk storage housings E00, E10, and so on up to E80, depending on the number of disks.

Figure 3:
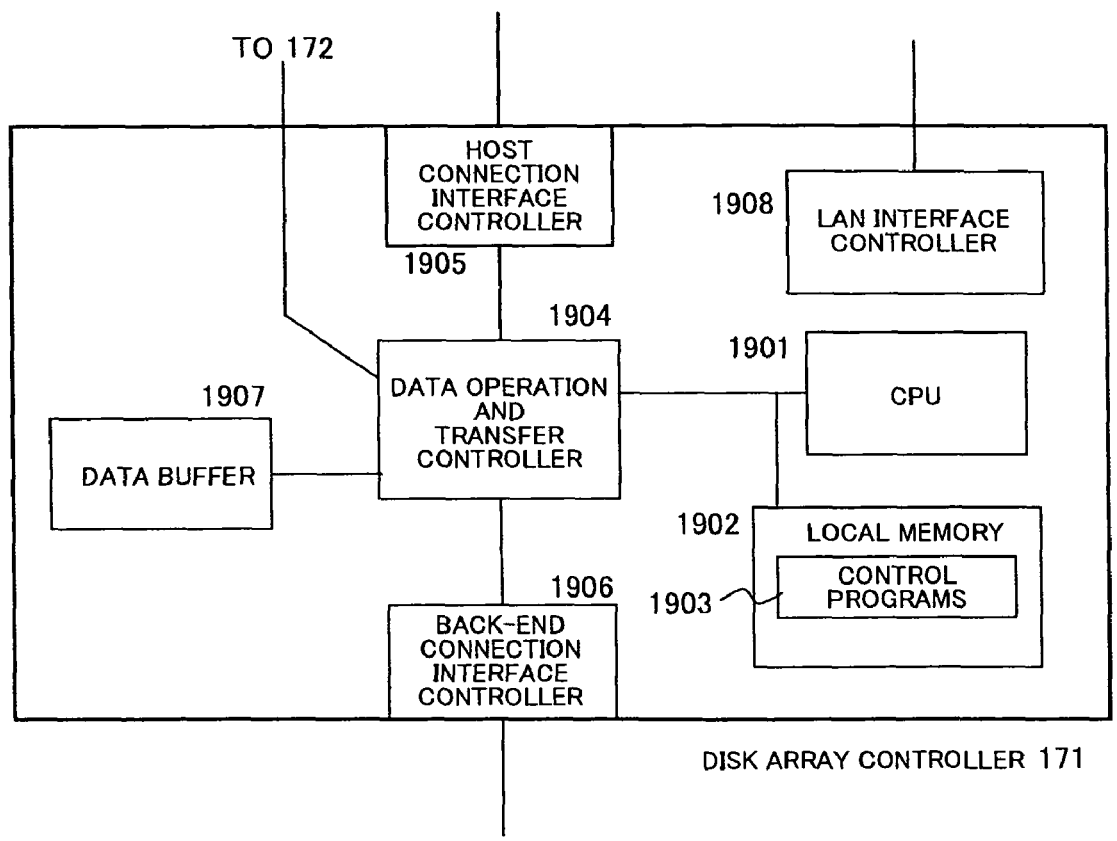
FIG. 3 is a block diagram illustrating the internal configuration of a disk array controller 171 according to the first embodiment.

FIG. 3 is a block diagram showing the internal configuration of the disk array controller 171 according to the first embodiment. Incidentally, the disk array controller 172 has the same internal configuration.

The disk array controller 171 includes a CPU 1901, memory 1902, a data operation and transfer controller 1904, a data buffer 1907, a host connection interface controller 1905, a backend connection interface controller 1906, and a LAN interface controller 1908. They are connected to each other via data transfer paths suitable for that purpose.

The CPU 1901 controls the various operations of the disk array apparatus by reading control programs 1903 stored in the memory 1902. The data operation and transfer controller 1904 transfers data to and from the memory 1902, the host connection interface controller 1905, the back-end connection interface controller 1906, and the data buffer 1907 in accordance with instructions from the CPU 1901. Also, the data operation and transfer controller 1904 uses the data buffer 1907 to perform specified operations including parity calculation and hash calculation with regard to specified data, as well as generation, addition, checking, and removal of data guarantee codes.

The host connection interface controller 1905 controls data input to and output from the host computers 3 shown in FIG. 1, and stores data in or takes out data from the data buffer 1907 whenever necessary.

The back-end connection interface controller 1906 inputs data to or outputs data from the disk D00 and other disks, and stores data in or takes data out from the data buffer 1907 whenever necessary.

The data buffer 1907 is memory composed of, for example, DIMM; and nonvolatile memory or volatile memory that is made nonvolatile by batteries or similar is used as the data buffer 1907.

The LAN interface controller 1908 is an interface controller that inputs or outputs data and control information via the management terminal system 5 and the management network 3.

Incidentally, the block diagram of the disk array controller shown in FIG. 3 is just an example, and the disk array controller may be either hardware or software as long as its functions remain the same. Also, the block configuration may be different. For example, the host connection interface controller 1905, the back-end connection interface controller 1906, the data buffer 1907, and the CPU 1901 may be mounted on separate substrates and connected to each other via a high-speed network.

Figure 4:
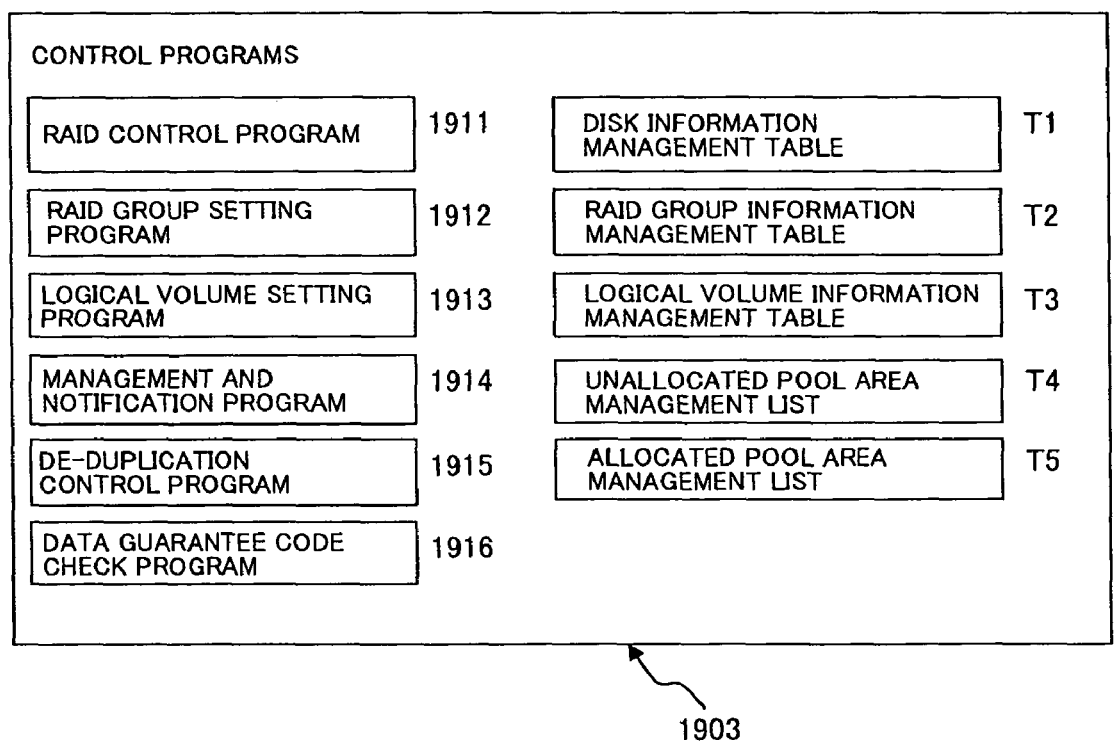
FIG. 4 is an explanatory diagram of programs and information management tables that constitute control programs 1903.

FIG. 4 is an explanatory diagram of programs and information management tables that constitute the control programs 1903. The control programs 1903 include: a RAID control program 1911, a RAID group setting program 1912, a logical volume setting program 1913, a management and notification program 1914, a de-duplication control program 1915, a data guarantee code check program 1916, a disk information management table T1, a RAID group information management table T2, a logical volume information management table T3, an unallocated pool area management list T4, and an allocated pool area management list T5.

The RAID control program 1911 processes data input or output by the host computer 3 in accordance with the RAID mechanism and inputs/outputs the data to/from the disk D00 and other disks. The RAID control program 1911 also executes recovery processing related to the above-described control.

The RAID group setting program 1912 generates, changes, or deletes RAID groups in accordance with instructions from the management terminal system 5 or the RAID control program 1911, using the RAID group information management table T2.

The logical volume setting program 1913 generates, changes, and deletes logical volumes in accordance with instructions from the management terminal system 5 and the RAID control program 1911, using the logical volume information management table T3. The logical volumes may be sometimes called "LU (Logical Units)."

The management and notification program 1914 sends/receives data to/from the management terminal 5. The de-duplication control program 1915 executes a processing sequence involving elimination of duplicate data in cooperation with the RAID control program 1911.

When the host computer makes a read request, the data guarantee code check program 1916 checks whether the relevant data was read from the correct position or not.

The disk information management table T1 is a table that records various information about the disk D00 and other disks. The "various information" herein specifically means, for example, the disk number, the disk capacity, the state of the relevant disk (for example, "normal state" or "failure"), and the group number of the RAID group to which the relevant disk belongs.

The RAID group information management table T2 is a table that records various information about a RAID group composed of the disk D00 and other disks. The "various information" herein specifically means the RAID group number, the RAID level, the number of disks included in the relevant RAID group, the effective capacity of the RAID group (the capacity that allows actual data writing), the state of the RAID group (for example, "normal," "degenerated," or "blocked"), the capacity allocated to logical volumes, and the capacity unallocated to logical volumes.

The logical volume information management table T3 is a table that records various information about logical disks (volumes [LU]) formed in the RAID configuration. The "various information" herein specifically means the logical volume number, the logical volume capacity, the state of the relevant logical volume (whether it is a "real volume," a "virtual volume," or a "pool volume"), the RAID group or pool volume number from which the relevant logical volume is allocated, an allocation start LBA (Logical Block Address) or end LBA in the case of a real volume, an actual used amount or a duplicate reduction ratio resulting from de-duplication in the case of a virtual volume, and allocated capacity or unallocated capacity in the case of a pool volume.

The "real volume" is a normal volume whose entire capacity is statically allocated on the disks in advance; and the "virtual volume" is a volume to which the capacity is dynamically allocated to only the part of the volume where data is written; and the "pool volume" is a volume that dynamically provides capacity (data blocks) to the virtual volume(s).

Figure 20:
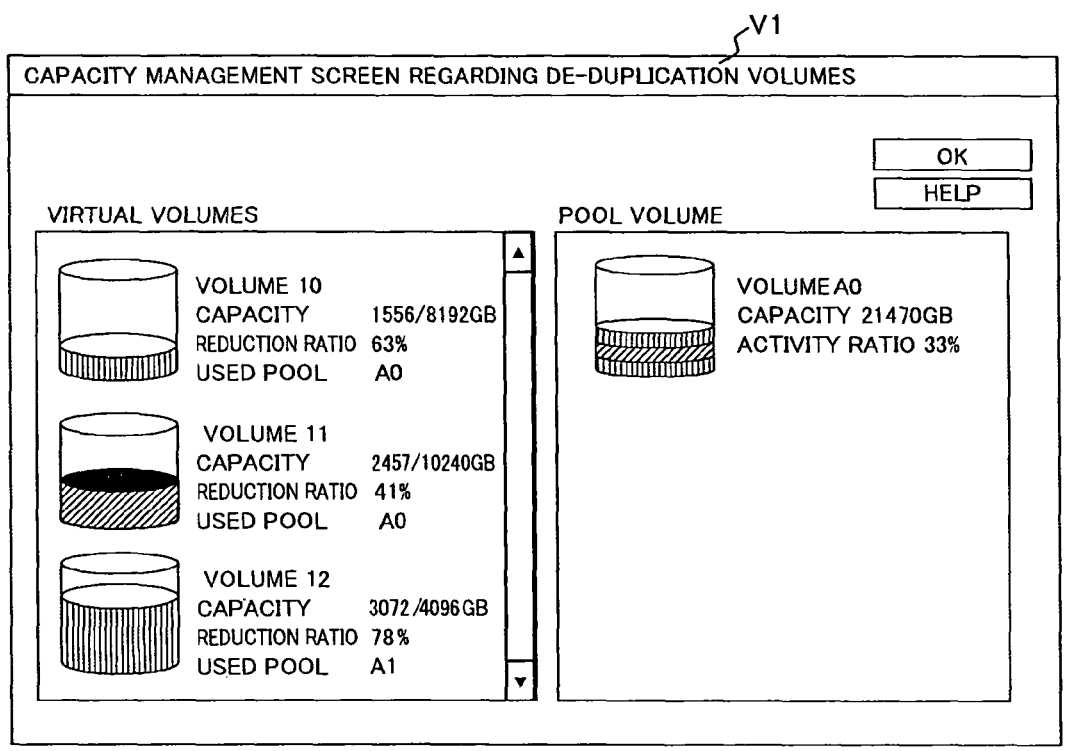
FIG. 20 is an example of a display screen 51 on a management terminal 5 when information about de-duplication volumes, from among volumes managed by a logical volume information management table T3, is displayed.

The content of the tables T1, T2, T3 can be placed in the memory 1902 and can be also confirmed on the management terminal system 5. The logical volume information is displayed on the management screen 51 like V1 in FIG. 20.

The unallocated pool area management list T4 is a list that manages, in logical data block(s), the unallocated capacity of volumes designated as the pool volumes from among the logical volumes.

The allocated pool area management list T5 is a list that manages, in logical data block(s), the allocated capacity of volumes designated as the pool volumes from among the logical volumes.

Figure 5:
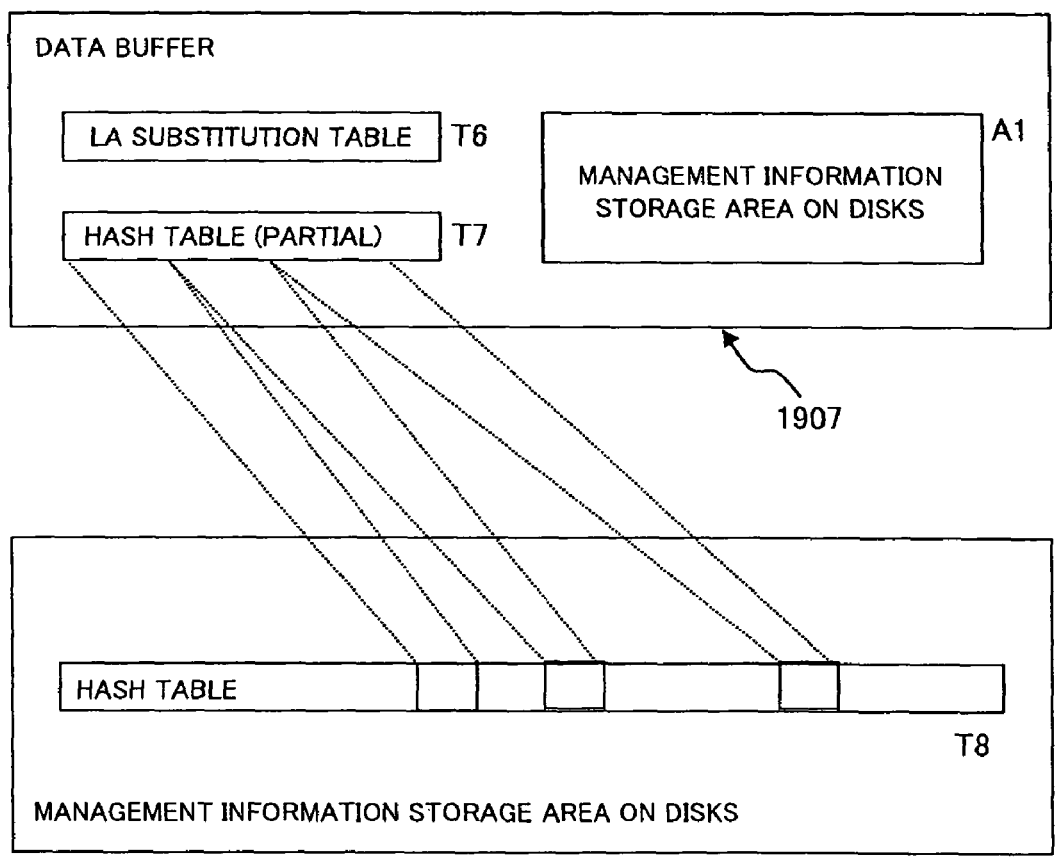
FIG. 5 is an explanatory diagram of information management tables and a data cache area included in a data buffer 1907.

FIG. 5 is an explanatory diagram showing information management tables and cache information stored in the data buffer 1907. The data buffer 1907 contains: an LA (Logical Address) substitution table T6, a partial hash table T7, and an input/output data cache area A1.

The LA substitution table T6 is an information table used by the CPU 1901 to rewrite LA information for the relevant check target volume, when checking the data guarantee code of a de-duplicated volume (LA/LRC check) using the data operation and transfer controller 1904.

The partial hash table T7 is a cached part of the entire hash table T8. Since the size of the hash table T8 is very large, the hash table T8 is stored in a management information storage area or similar on the disks. If the size of the data buffer 1907 is sufficiently large, caching to prepare the partial hash table T7 may not take place, and the entire hash table T8 may be located in the data buffer 1907 instead.

The input/output data cache area A1 is a working memory area that is used to cache data input to or output from the host computer 3 and other host computers and the disk D00 and other disks, and used for RAID parity operations and hash value operations.

FIG. 6 is an explanatory diagram of the unallocated pool area management list according to the first embodiment. In the unallocated pool area management list T4, unused logical data blocks not allocated to virtual volumes are recorded using LAs. An LA (Logical Address) is composed of the logical volume number (LUN [Logical Unit Number]) of the relevant logical volume and the address of the relevant data block in the logical volume (LBA [Logical Block Address]) and is address information inherent to the relevant logical data block.

FIG. 7 is an explanatory diagram of the allocated pool area management list according to the first embodiment. In the allocated pool area management list T5, logical data blocks already allocated to virtual volumes are recorded using LAs. At the same time, how many times those blocks are referred to for de-duplication is also recorded in this list.

FIG. 8 is an explanatory diagram of an LA substitution table according to the first embodiment. The LA substitution table T6 records information about LAs that should be substituted at the time of the data guarantee code checking (LA/LRC checking). For example, if "LUN10: LBA88590" is to be checked, you can tell from this table that the LA information needs to be replaced with "LUN90: LBA343562."

FIG. 9 is an explanatory diagram of a hash table according to the first embodiment. The hash table T7, T8 is a table that records a hash value for the content of a data block actually written to the disks, and the LA of that data block. You can tell from the hash table T7, T8 that, for example, the data block to which the content indicated by the hash value 603AB32353 is written is stored at the location indicated by the address "LUN90: LBA353462."

Figure 10:
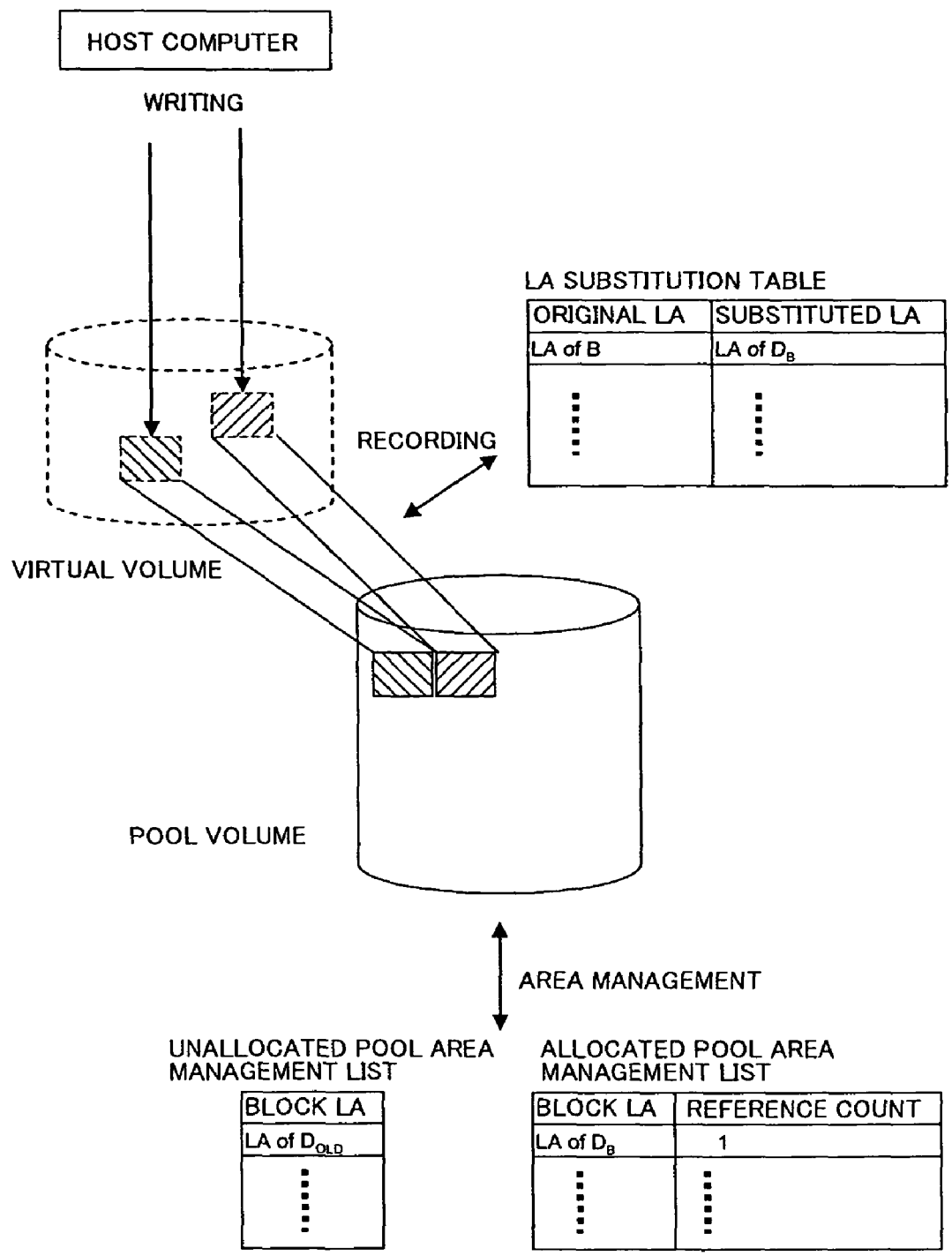
FIG. 10 is a pattern diagram illustrating a relationship between a virtual volume, a pool volume, and the respective information management tables according to the first embodiment.

FIG. 10 is a pattern diagram illustrating the relationship between the virtual volume, the pool volume, the unallocated pool area management list, the allocated pool area management list, and the LA substitution table for easier understanding of the above explanation.

The host computer recognizes the virtual volume as if it were a real volume. The host computer designates a virtual volume address to write data. The data written by designating the virtual volume address is once stored in a cache for the disk array controller. After specified operation and processing is executed, the data is written to a disk area secured as a pool volume. The unallocated pool area management list and the allocated pool area management list cooperate with each other to record which block is used or which block is released (i.e., which block is unallocated [empty]). Also, the LA substitution table is updated by the control programs for the disk array controller when necessary.

Figure 11:
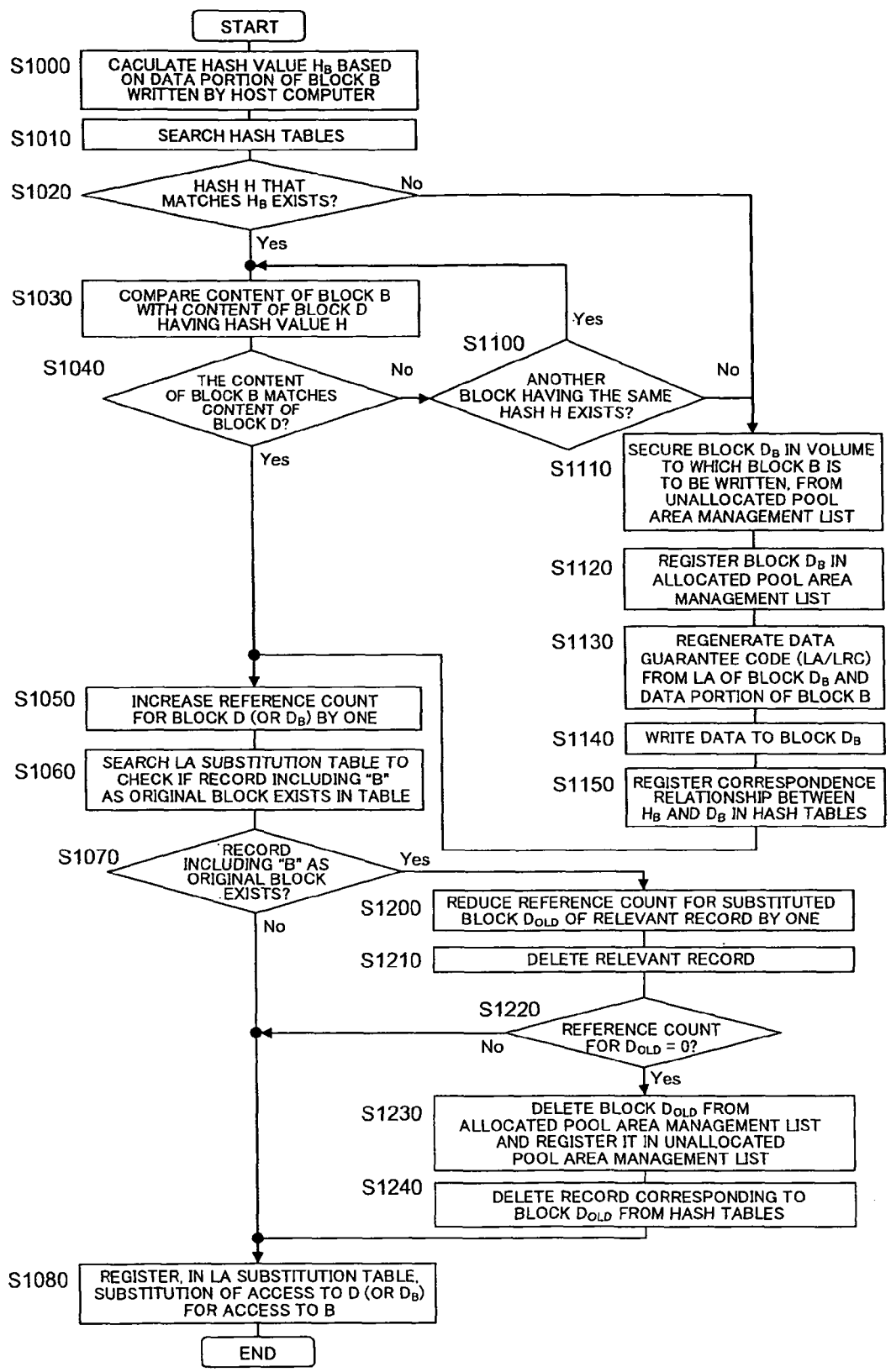
FIG. 11 is a flowchart illustrating steps in processing executed by a de-duplication control program 1915 in response to a write request from a host computer according to the first embodiment.

FIG. 11 is a flowchart illustrating duplicate data eliminating processing executed by a de-duplication control program 1915 when data is written by the host computer during de-duplication processing according to the first embodiment.

After block B written by the host computer by designating a virtual volume address is stored in the input/output data cache area A1 of the disk array controller 171 and other disk array controllers, the de-duplication control program 1915 calculates a hash value HB based on the data content of the written block B (S1000). At this point in time, a data guarantee code (LA/LRC) based on the virtual volume address is added automatically to block B by the data operation and transfer controller 1904.

Subsequently, the control program 1915 searches the hash tables T7, T8 to check if a hash value H that matches the hash value $H_B$ exists or not (S1010). If it is found, as a result of the search, that a matching hash value H exists (S1020: Yes), the control program 1915 compares the actual data content of block B with the content of block D with the hash value H (S1030). This is because the blocks having the same hash value may have different content (which is the case where synonyms exist).

If it is found, as a result of the comparison, that the content of block B matches the content of block D (S1040: Yes), this means that block B and block D have redundant content and, therefore, it is judged that de-duplication can be performed. As a result, the reference count for block D will increase. Therefore, in order to record this, the control program 1915 increases the reference count for block D by one, using the allocated pool area management list T5 (S1050).

Then, processing regarding the LA substitution table T6 starts. The de-duplication control program 1915 refers to and searches The LA substitution table T6 to check if a record indicating the LA of block B as the original LA exists (S1060). If no such record exists (S1070: No), the de-duplication control program 1915 records the LAs of block B and block D in the LA substitution table T6 so that an access to block B will be redirected to block D (S1080).

On the other hand, if the hash value H that matches the hash value $H_B$ does not exist in S1020 (S1020: No), this means that block B does not have duplicate content of any other data blocks recorded on the disks in the past. Therefore, the de-duplication control program 1915 secures a new empty block $D_B$ in a volume to write the content of block B from the unallocated pool area management list T4 (S110), and registers block $D_B$ in the allocated pool area management list T5 instead (S1120).

Then the de-duplication control program 1915 discards the data guarantee code (LA/LRC), which was based on the virtual volume address, that was automatically added when block B was stored in the input/output data cache area A1; and the de-duplication control program 1915 generates a new data guarantee code (LA/LRC) from the LA of block $D_B$ and the data content of block B (S1030) and writes that new data guarantee code and the content of block B to block $D_B$ (S1040).

The de-duplication control program 1915 then records in the hash tables T7, T8 that the content of block B showing the hash value $H_B$ was written to block $D_B$ (S1050), and increases the reference count for block $D_B$ by one (S1050). After that, the de-duplication control program 1915 executes processing in S1060 and S1070 and then records the LAs of both block B and block $D_B$ in the LA substitution table T6 in S1080 so that an access to block B will be redirected to block $D_B$.

On the other hand, if it is found, as a result of the comparison between the data content of block B and the content of block D with the hash value H, that these content does not match (S1040), you can tell that block B and block D have the same hash value, but their contents are different (i.e., block B and block D are synonyms).

The de-duplication control program 1915 then searches the hash tables T7, T8 to check whether or not another block having the same hash value H exists (S1100). If such another block exists (S1100: Yes), the de-duplication control program 1915 compares that block with block B in the same manner as described above (return to S1030).

If another such block does not exist (S1100: No), this means that block B does not have any duplicate content of any other data blocks recorded on the disks in the past. Therefore, the de-duplication control program 1915 executes the processing in S1110 and subsequent steps to write new data to the disks. The processing in S1110 and subsequent steps is explained earlier.

On the other hand, if a record indicating the LA of block B which is the original LA exists in the LA substitution table T6 in S1070 (S1070: Yes), this means that the host computer wrote data to the address of block B and that written content is now updated. In other words, processing associated with rewriting the content of block B is necessary. In order to first delete past association information, the de-duplication control program 1915 reduces the reference count for block $D_{OLD}$, which is designated as a substituted block of the relevant record, by one using the allocated pool area management list T5 (S1200), and then deletes the record from the LA substitution table T6 (S1210). Next, the de-duplication control program 1915 refers to the allocated pool area management list T5 again to check if the reference count for block $D_{OLD}$ is zero or not (S1220).

If it is found, as a result of the check, that the reference count is "0" (S1220: Yes), you can tell that no reference has been made to block $D_{OLD}$. Therefore, the de-duplication control program 1915 deletes the record for block $D_{OLD}$ from the allocated pool area management list T5 and registers it in the unallocated pool area management list T4 (S1230). Then, the de-duplication control program 1915 also deletes the record of $D_{OLD}$ from the hash tables T7, T8 (S1240). Subsequently, the de-duplication control program 1915 registers a new association relationship in the LA substitution table (S1080).

Figure 12:
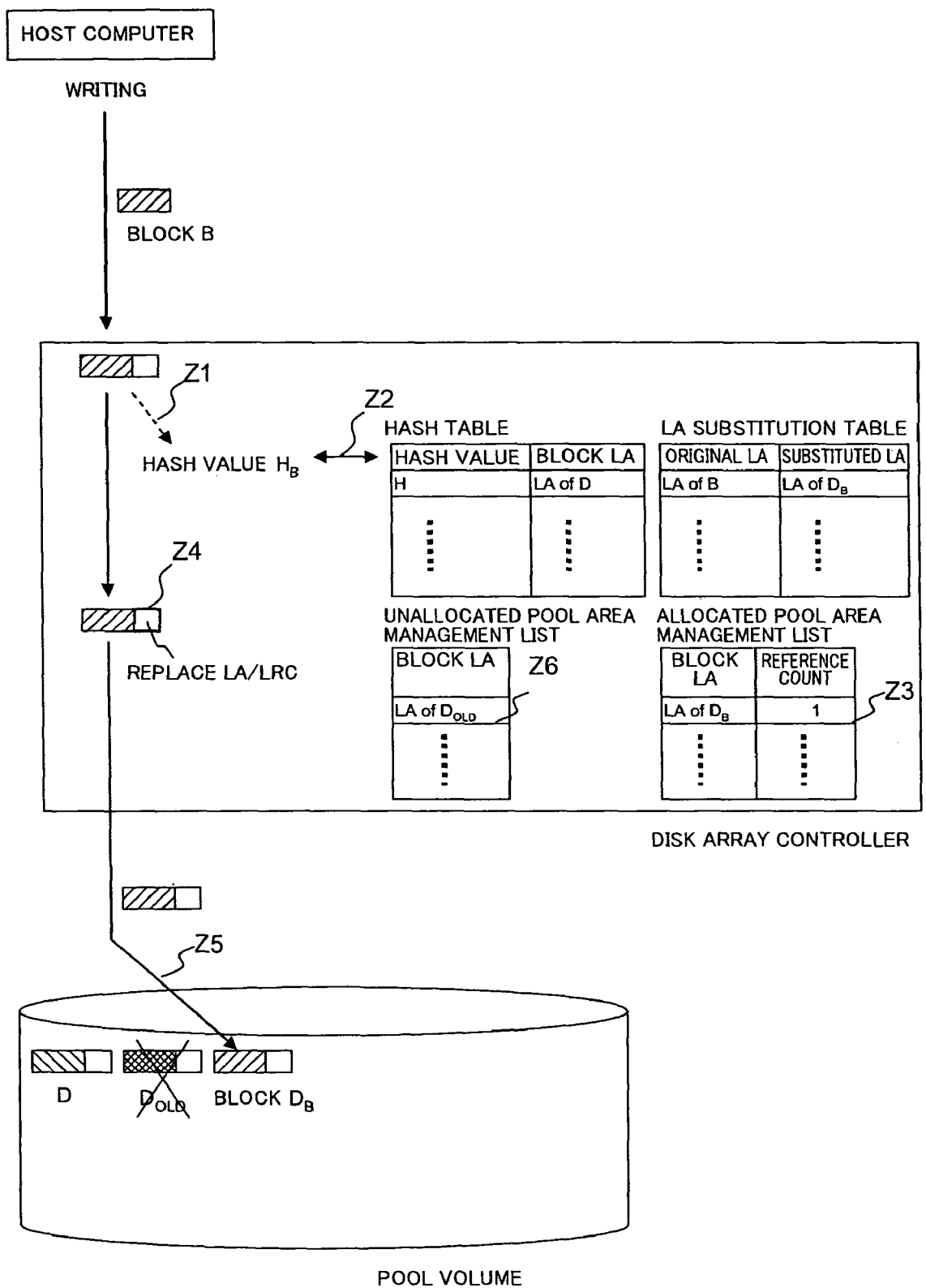
FIG. 12 is a pattern diagram explaining the processing executed by the de-duplication control program 1915 in response to a write request from the host computer according to the first embodiment.

FIG. 12 is a pattern diagram for easier understanding of explanation of the operation shown in FIG. 11 above. After block B written by the host computer is stored in the cache for the disk array controller, the hash value $H_B$ is calculated (S1000, Z1). The value $H_B$ is compared with the hash tables (S1010, Z2); and if it is newly written data, a write block $D_B$ is allocated from the pool area (S1110, S1120, Z3). A data guarantee code is generated (S1030, Z4), and this data guarantee code and the content of block B are written to block $D_B$ in the pool volume (S1040, Z5).

If writing of block B is an update of the content (S1070: Yes), processing for an old substituted LA $D_{OLD}$ is executed. If reference is no longer made to $D_{OLD}$ (S1220: Yes), the $D_{OLD}$ information is deleted from the allocated pool area management list and the hash tables, and is then registered in the unallocated pool area management list (S1230, S1240, Z6).

Figure 13:
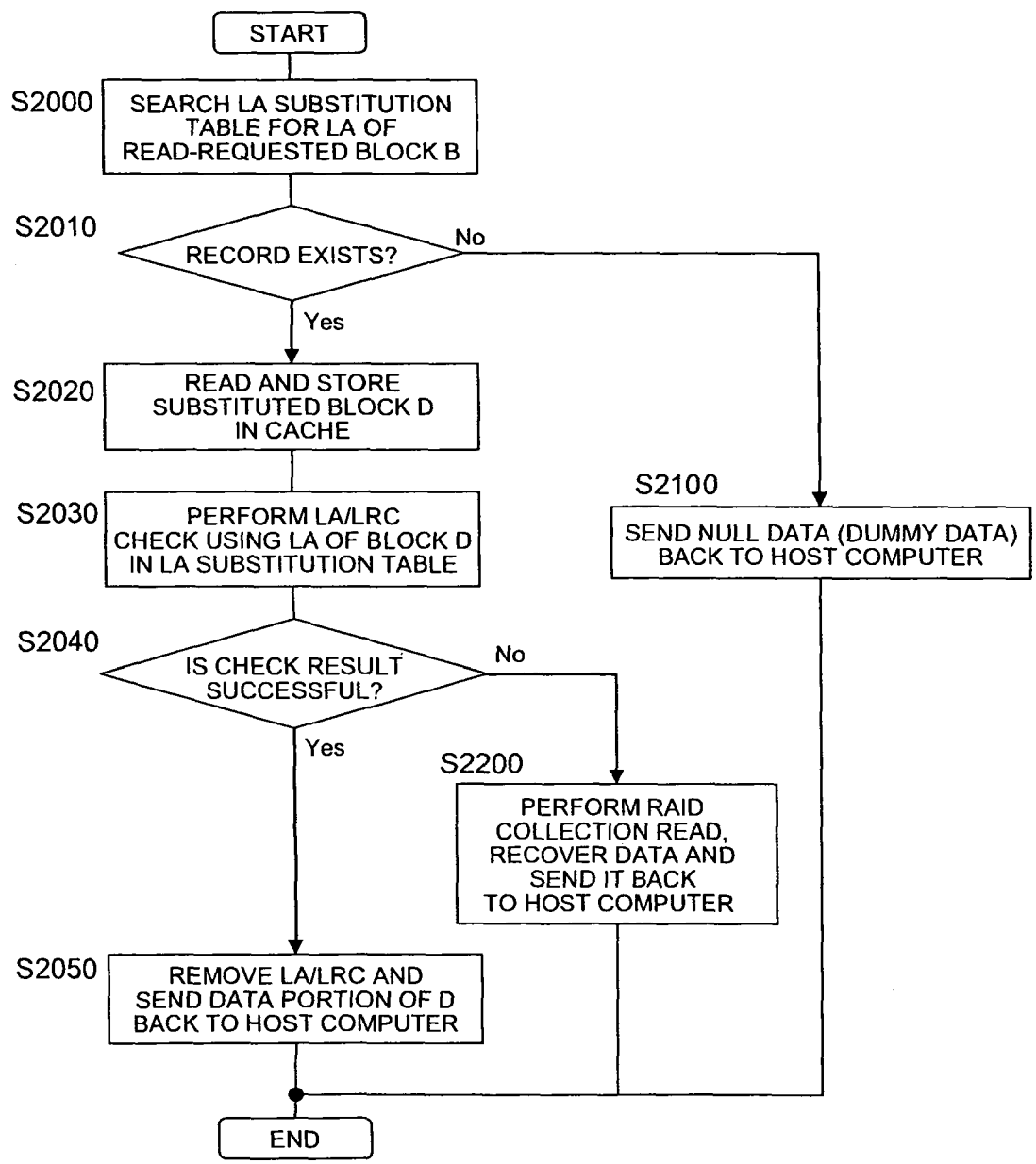
FIG. 13 is a flowchart illustrating steps in processing executed by the de-duplication control program 1915 and a data guarantee code check program 1916 in response to a read request from the host computer according to the first embodiment.

FIG. 13 is a flowchart illustrating processing executed by the de-duplication control program 1915 and the data guarantee code check program 1916 when the host computer tries to read data during the de-duplication according to the first embodiment.

When the host computer gives an instruction to read block B (a read request) by designating the virtual volume address of block B, the de-duplication control program 1915 searches the LA substitution table T6 for the LA of block B that is the target of the read request (S2000). If the relevant record exists (S2010: Yes), the de-duplication control program 1915 reads the data content and the data guarantee code from block D, which is designated as a substituted block, and stores them in the input/output data cache area A1 (S2020).

At this point in time, the data guarantee code check program 1916 is trying to check the data guarantee code of block D stored in the input/output data cache area $A1_1$, using the LA of block B. The de-duplication control program 1915 rewrites check target LA information for the data guarantee code check program 1916, i.e., changes the LA of block B to the LA of block D, using the information in the LA substitution table T6 (S2030).

The data guarantee code check program 1916 uses the data guarantee code (LA/LRC) stored in the input/output data cache area A1 to first check the LRC and make sure there is no garbled data. Subsequently, the guarantee code check program 1916 uses the LA information rewritten in S2030 to conduct checking and make sure the data was read from the correct position.

If the data is not garbled and was read from the correct position (i.e., block D) on the disks, the check result is successful. In this case (S2040), the data guarantee code check program 1916 removes the data guarantee code (LA/LRC) and sends the data content back to the host computer (S2050).

On the other hand, if the relevant record does not exist in the LA substitution table T6 in S2010, this means that no data was written to the address in block B in the past. So, null data (dummy data such as zero) is sent back to the host computer (S2100).

On the other hand, if the data is garbled or was not read from the correction position in S2040 (S2040: No), the programs 1915 and 1916 recover the data for the relevant block under the data-rebuilding-mechanism of the RAID, and send it back to the host computer (S2200).

According to the above-described embodiment, even a disk array apparatus having the data guarantee code adding and checking mechanism can implement the function reducing the data amount effectively by means of de-duplication.

Also, this embodiment described the operation of the host computer writing and reading online data. However, if a copy source volume is considered instead of the host computer, the first embodiment can be applied to, for example, the case where the copy source volume is de-duplicated when duplicating volumes in the disk array apparatus.

There is a method for substituting an access request itself from the host computer according to the second embodiment of the present invention. Specifically speaking, a request to read block B2 is processed as if it were originally a request to read block B1. The second embodiment will be described below with reference to FIGS. 14 to 19.

Figure 14:
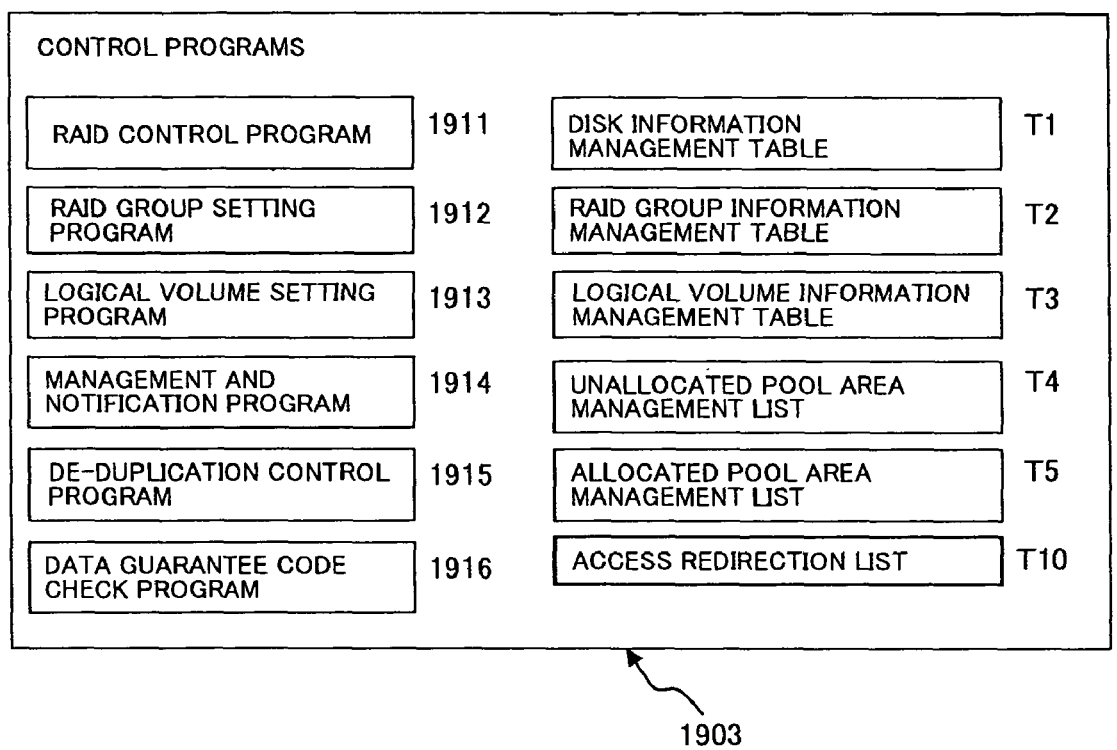
FIG. 14 is an explanatory diagram of programs and information management tables that constitute control programs 1903 according to a second embodiment of the invention.

FIG. 14 is an explanatory diagram showing programs and information management tables that constitute control programs 1903 according to the second embodiment. The control programs 1903 include an access redirection list T10 in addition to the programs and the information management tables included in the configuration according to the first embodiment.

The access redirection list T10 is a list for replacing an access request from the host computer with a representative access request for which reference is made to the same data for the purpose of duplicate elimination.

Figure 15:
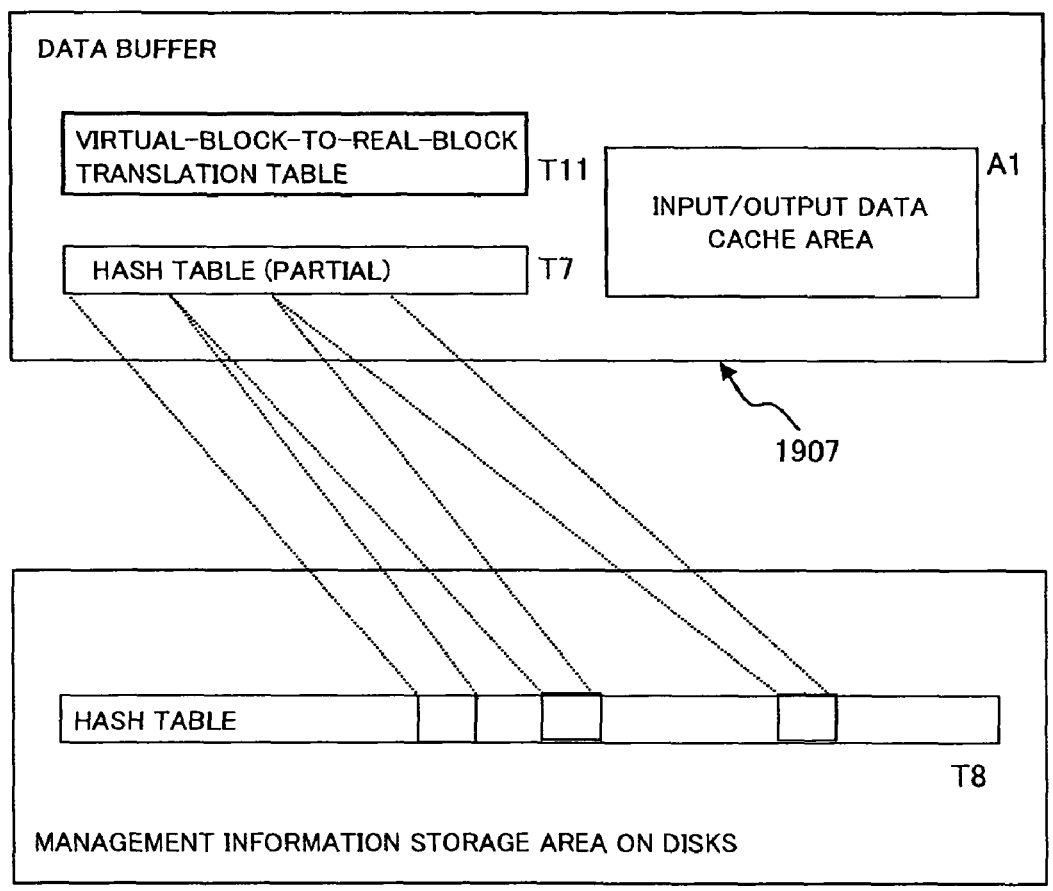
FIG. 15 is an explanatory diagram of information management tables and a data cache area included in a data buffer 1907 according to the second embodiment.

FIG. 15 is an explanatory diagram of the information management tables and cache information stored in a data buffer 1907 according to the second embodiment. The data buffer 1907 contains a virtual-block-to-real-block translation table T11 instead of the LA substitution table T6 according to the first embodiment. The virtual-block-to-real-block translation table T11 is a table that translates the LA in a virtual volume, which is indicated as a representative access request target in the access redirection list T10, to the LA of a real block in a pool volume.

FIG. 16 is an explanatory diagram of the configuration of the access redirection list T10 according to the second embodiment. The access redirection list T10 retains, in a list configuration, the LAs of blocks on the virtual volume that refer to the same data content in de-duplication. This table shows that, for example, blocks B1, B2, and B7 are blocks in the virtual volume that refer to the same data content, and accesses to these blocks are represented by block B1 that is an element of the list configuration.

FIG. 17 is an explanatory diagram of the configuration of the virtual-block-to-real-block translation table T11 according to the second embodiment. The virtual-block-to-real-block translation table T11 manages a correspondence relationship between representative access blocks on the virtual volume and real blocks on the pool volume, using LAs.

Figures 1, 18:
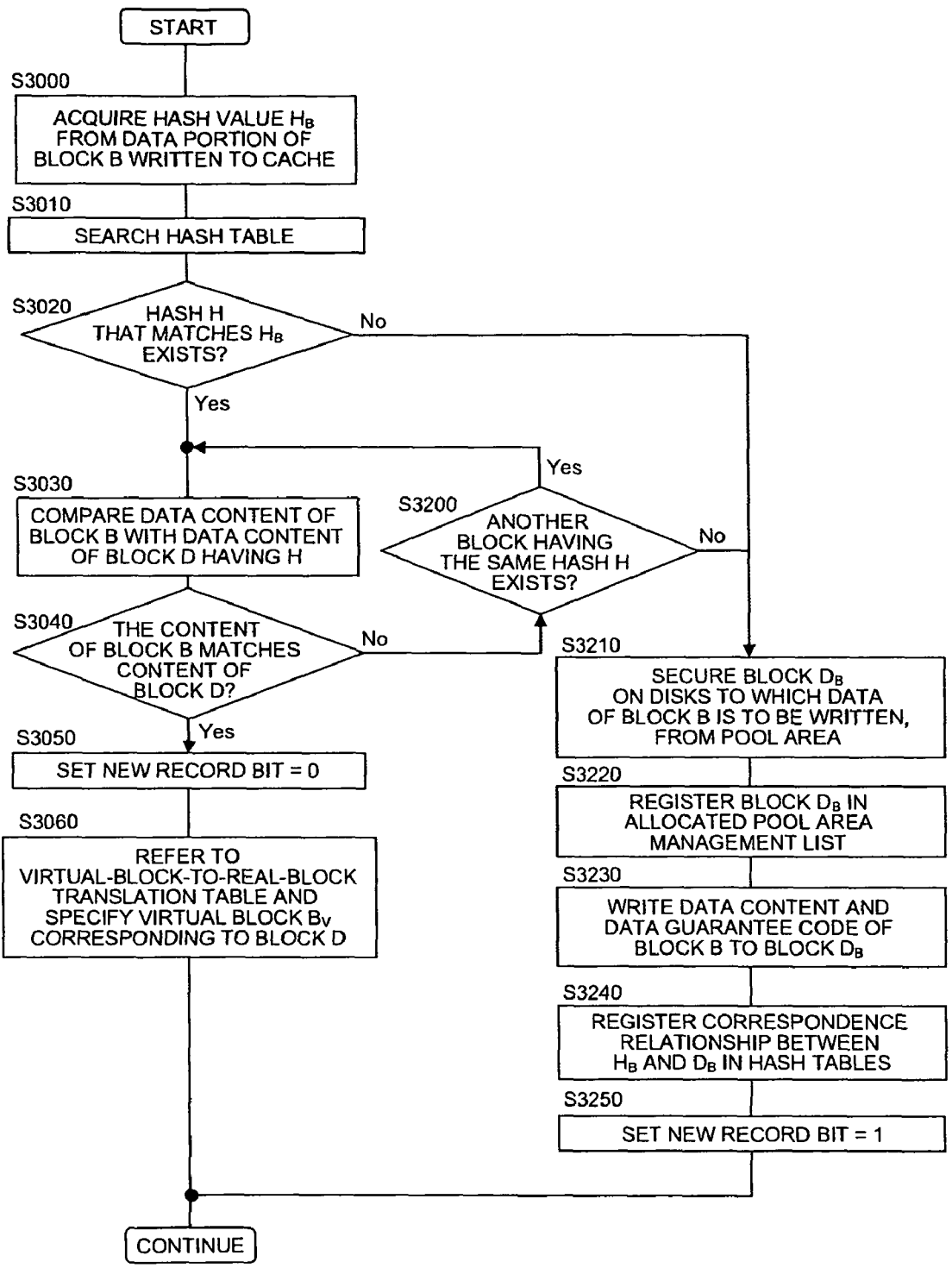
Figures 2, 18:
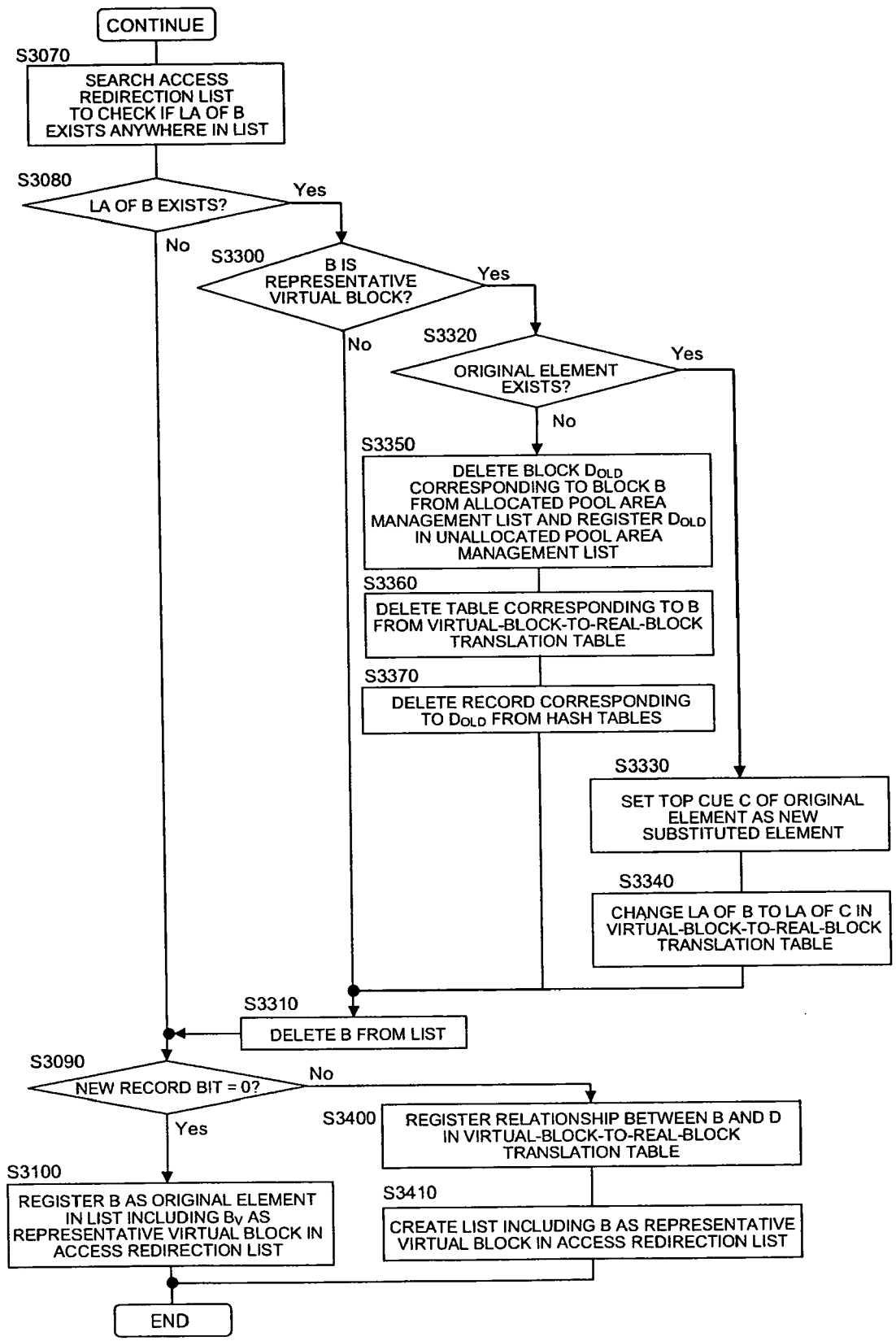

FIGS. 18-1 and 18-2 are flowcharts illustrating duplicate data elimination processing executed by the de-duplication control program 1915 when the host computer writes data during the de-duplication processing according to the second embodiment.

After block B written by the host computer by designating a virtual volume address is stored in the input/output data cache area A1 of the disk array controller 171 and other disk array controllers, the de-duplication control program 1915 calculates a hash value $H_B$ based on the written block B (S3000). At this point in time, a data guarantee code (LA/LRC) based on the virtual volume address is added automatically to block B by the data operation and transfer controller 1904.

Subsequently, the control program 1915 searches the hash tables T7, T8 to check if a hash value H that matches the hash value $H_B$ exists or not (S3010). If it is found, as a result of the search, that a matching hash value H exists (S3020: Yes), the control program 1915 compares the actual data content of block B with the content of block D with the hash value H (S3030). This is because blocks having the same hash value may have different content (which is the case where synonyms exist).

If it is found, as a result of the comparison, that the content of block B matches the content of block D (S3040: Yes), this means that block B and block D have redundant content and, therefore, it is judged that de-duplication can be performed. As a result, a new record bit stored in the de-duplication control program 1915 is set to "0" (S3050). This is a flag to temporarily store the fact that block B is not the data to be newly recorded on the disks.

The de-duplication control program 1915 then refers to the virtual-block-to-real-block translation table T11 for the subsequent processing and identifies a representative block on the virtual volume (hereinafter referred to as the "representative virtual block") $B_V$ corresponding to block D (S3060).

Next, processing for rewriting the access redirection list T10 is started. The de-duplication control program 1915 refers to and searches the access redirection list T10 to check if the LA of block B is recorded anywhere in the list (S3070). If the record does not exist (S3080: No), the de-duplication control program 1915 checks the new record bit that was internally stored in advance (S3090). If the new record bit is "0" (S3090: Yes), the de-duplication control program 1915 registers the LA of block B in a list including $B_V$ as a representative virtual block.

On the other hand, if a hash value H that matches the hash value $H_B$ does not exist in S3020 (S3020: No), this means that block B does not have redundant data of any data blocks recorded on the disks in the past. Therefore, the de-duplication control program 1915 secures an empty block $D_B$ in a volume to write the new content of block B from the unallocated pool area management list T4 (S3210), and registers block $D_B$ in the allocated pool area management list T5 (S3220). Subsequently, the de-duplication control program 1915 writes the data and data guarantee code of block B to block $D_B$ (S3230).

Then, the de-duplication control program 1915 records, in the hash tables T7, T8, that the content of block B showing the hash value $H_B$ has been written to block $D_B$ (S3240); and the de-duplication control program 1915 sets its internally stored new record bit to "1" (S3250). This is a flag to temporarily store the fact that block B is the data to be newly recorded on the disks by the de-duplication control program 1915 for the subsequent processing.

If the new record bit is "1" (S3090: No), this means that block B is a new representative virtual block, so the de-duplication control program 1915 records a correspondence relationship between block B and block $D_B$, which is the write target, in the virtual-block-to-real-block translation table T11 (S3400). Also, the de-duplication control program 1915 creates a new list including block B as the representative virtual block in the access redirection list T10 (S3410).

On the other hand, if it is found in S3080 that the LA of block B is recorded in the access redirection list T10 (S3080: Yes), this means that the host computer wrote data to the address of block B in the past and that written content is now updated. In other words, processing associated with rewriting the content of block B is necessary. Thus, the de-duplication control program 1915 checks if block B is the representative virtual block or not (S3300). If block B is not the representative virtual block (S3300: No), block B will not influence other blocks, so the de-duplication control program 1915 simply deletes the record of block B from the access redirection list T10 (S3310).

On the other hand, if it is found in S3300 that block B is the representative virtual block (S3300: Yes), the processing will be different depending on whether other elements exist in the list or not. If other elements exist (S3320: Yes), the de-duplication control program 1915 sets a top element C of the original block as a new representative virtual block (S3330) and rewrites the LA of block B and replaces it with the LA of block C in the virtual-block-to-real-block translation table T10 (S3340).

If other elements do not exist (S3320: No), it is necessary to delete the real block that stores the data content of block B (i.e., to register the data content as in unused/unallocated state). Specifically speaking, the de-duplication control program 1915 deletes the real block $D_{OLD}$ corresponding to block B from the allocated pool area management list T5 and registers it in the unallocated pool area management list T4 (S3350). Then, the de-duplication control program 1915 deletes the record of the correspondence relationship between block B and block $D_{OLD}$ from the virtual-block-to-real-block translation table T11 (S3360) and deletes the record of block $D_{OLD}$ from the hash tables T7, T8 (S3370). Lastly, the de-duplication control program 1915 deletes the record of block B from the access redirection list T10 (S3310)

Figure 19:
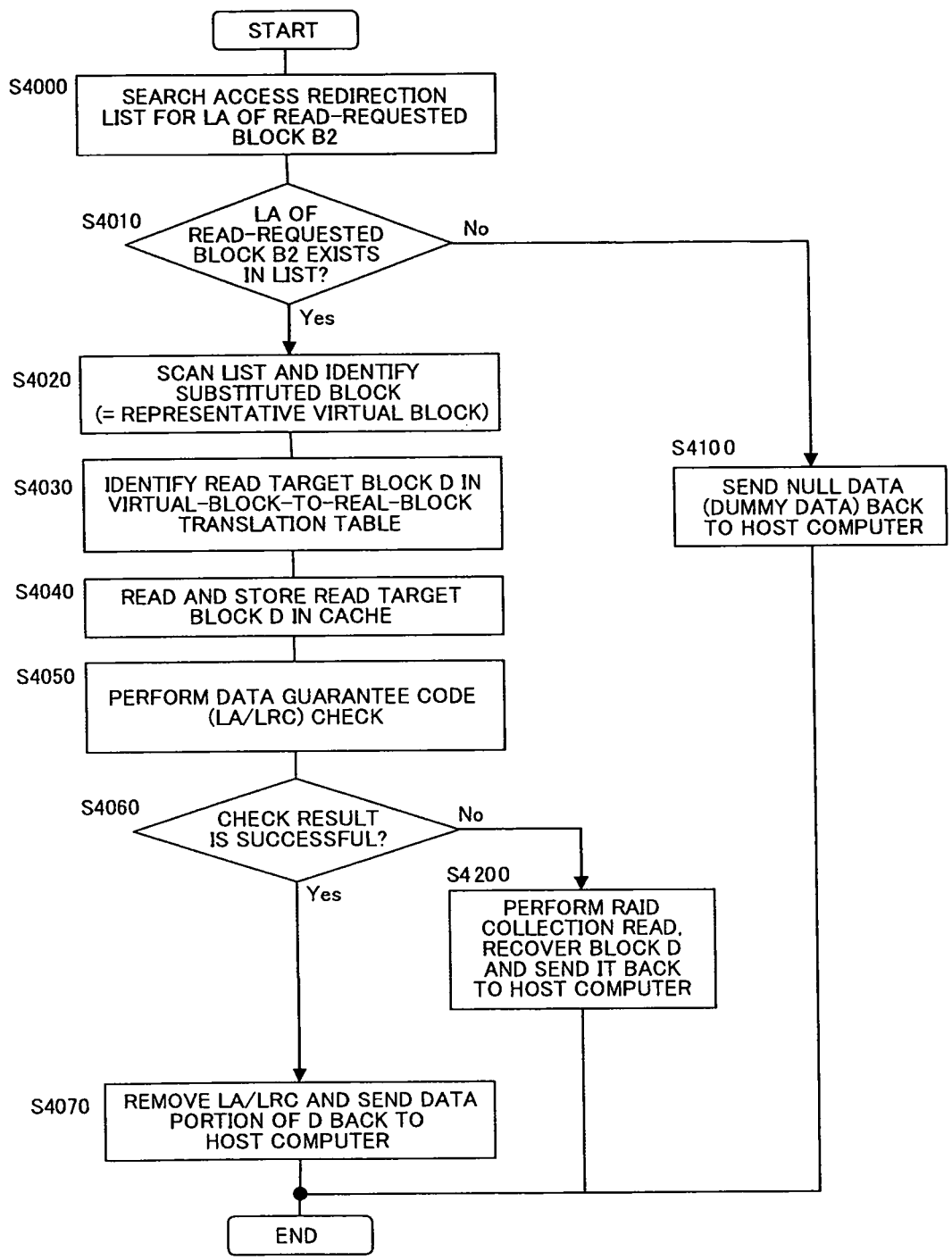
FIG. 19 is a flowchart illustrating steps in processing executed by the de-duplication control program 1915 and the data guarantee code check program 1916 in response to a read request from the host computer according to the second embodiment.

FIG. 19 is a flowchart illustrating processing executed by the de-duplication control program 1915 and the data guarantee code check program 1916 when the host computer tries to read data during the de-duplication processing according to the second embodiment of the invention.

If the host computer gives an instruction (a read request) to read block B2 by designating the virtual volume address, the de-duplication control program 1915 searches the access redirection list T10 for the LA of block B2, which is the read request target (S4000). If it is found, as a result of the search, that the LA of block B2 is recorded in the access redirection list T10 (S4010: Yes), the de-duplication control program 1915 scans the list, identifies a representative virtual block B1 of the list including block B2, and executes subsequent processing as if the read request were a request to read block B1 (S4010).

The de-duplication control program 1915 refers to the virtual-block-to-real-block translation table T11 and identifies block D—the actual location to store block B1 (S4020), reads the data and data guarantee code of that block from the disks, and stores them in the input/output data cache area A1 (S4030).

The data guarantee code check program 1916 checks the data guarantee code (LA/LRC), recognizing that the read request was made to read block B1. Specifically speaking, after the LRC check, the data guarantee code check program 1916 checks the LA of the data guarantee code stored in the input/output data cache area A1, recognizing that the check target information is the LA of block B1 (S4050).

If the relevant data was not garbled and was read from the correct position (i.e., block D) on the disks, the LA/LRC based on the LA of block B is stored as the data guarantee code of block D, and the check result will be positive. In this case (S4060), the data guarantee code check program 1916 removes the data guarantee code (LA/LRC) and sends the data content back to the host computer (S4070).

On the other hand, if it is found in S4010 that the LA of block B2 is not recorded in the access redirection list T10 (S4010: No), this means that no data was ever written to the address of block B in the past, and the data guarantee code check program 1916 sends null data (dummy data such as zero) back to the host computer (S4100).

On the other hand, if it is found in S4060 that the data was garbled or was not read from the correct position on the disks (S4060: No), the data guarantee code check program 1916 recovers the data of the relevant block under the data-rebuilding-mechanism of the RAID, and sends it back to the host computer (S4200).

According to the second embodiment described above, as in the first embodiment, even a disk array apparatus with the mechanism of adding and checking a data guarantee code can also have a function that effectively reduces the amount of data by means of de-duplication.

If a copy source volume is considered instead of the host computer, the second embodiment, like the first embodiment, can also be applied in the case where the copy source volume is de-duplicated when duplicating volumes in the disk array apparatus.

Moreover, since the data guarantee code stored in the disks depends on the LA of block D in the pool volume in the first embodiment, physical migration in the pool volume that may cause, for example, a change in the LBA of block D, could not be easily conducted. However, the data guarantee code according to the second embodiment does not depend on the storage location of block D in the pool volume. Therefore, the pool volume can be easily migrated to another volume composed of inexpensive disks, or can be easily migrated to or duplicated in another volume in a remote disk array apparatus.

The disk array apparatus and the method for controlling the disk array apparatus according to the two embodiments of the present invention have been described above. However, these embodiments are intended for easier understanding of the invention, not to limit the invention. It is a matter of course that the invention can be changed or improved without departing from the gist of the invention and the scope of its claims and any that equivalents of the invention may be included in the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage sub-system comprising:
   a storage device;
   memory including a control program; and
   a controller for controlling a host computer's access to the storage device to write/read data to/from the storage device in accordance with the control program;
   wherein the controller generates a data guarantee code according to an inherent attribute of the data;
   adds the data guarantee code to the data and writes the data to the storage device;
   checks the data guarantee code to judge whether the data is error-free or not when reading the data from the storage device;
   stores, if there are first data and second data as the data and the content of the first data and the content of the second data are the same, the first data together with the data guarantee code in the storage device without storing the second data in the storage device;
   associates the host computer's read access to the second data with the first data; and
   has a change table for changing an inherent attribute of the second data so that the data guarantee code generated when processing the host computer's read access to the second data, matches the data guarantee code of the first data.

2. The storage sub-system according to claim 1, wherein the controller:
includes a first logical volume accessed by the host computer and a second logical volume to which a storage area of the storage device is allocated;
writes the first data to a second logical address of the second logical volume in response to the host computer's write access to a first logical address of the first logical volume;
reads the first data from the second logical address in response to the host computer's read access to a third logical address of the first logical volume to read the second data;
generates the data guarantee code of the first data based on the second logical address;
includes a correspondence table that associates the first logical address and the third logical address with the second logical address respectively, and a table serving as the change table that changes the third logical address to the second logical address;
acquires the second logical address according to the correspondence table when processing the host computer's read access to the second data;
acquires the second logical address from the third logical address according to the change table and generates the data guarantee code based on the second logical address when generating the data guarantee code in response to the read access to the second data; and
judges whether the then generated data guarantee code matches the data guarantee code added to the first data.

3. The storage sub-system according to claim 1, wherein the controller:
includes a first logical volume accessed by the host computer and a second logical volume to which a storage area of the storage device is allocated;
writes the first data to a second logical address of the second logical volume in response to the host computer's write access to a first logical address of the first logical volume;
reads the first data from the second logical address in response to the host computer's read access to a third logical address of the first logical volume to read the second data;
generates the data guarantee code of the first data based on the first logical address;
includes a correspondence table that associates the first logical address and the third logical address with the second logical address respectively, and a table serving as the change table that changes the third logical address to the first logical address;
acquires the second logical address according to the correspondence table when processing the host computer's read access to the second data;
acquires the first logical address from the third logical address according to the change table and generates the data guarantee code based on the first logical address when generating the data guarantee code in response to the read access to the second data; and
judges whether the then generated data guarantee code matches the data guarantee code added to the first data.

4. The storage sub-system according to claim 2, wherein the second logical volume is a volume to which the storage capacity of the storage device is dynamically allocated in response to the host computer's write access to the first logical volume.

5. The storage sub-system according to claim 3, wherein the second logical volume is a volume to which the storage capacity of the storage device is dynamically allocated in response to the host computer's write access to the first logical volume.

6. The storage sub-system according to claim 1, wherein the controller judges based on a hash value whether the first data and the second data are the same or not.

7. The storage sub-system according to claim 1, wherein the inherent attribute of the second data is a logical address of a logical volume in which the second data is stored.

8. A storage sub-system comprising:
a storage device;
memory including a control program; and
a controller for controlling a host computer's access to the storage device to write/read data to/from the storage device in accordance with the control program;
wherein the controller includes:
a first data guarantee code generator for generating a data guarantee code based on a first logical address of the data when writing the data to a logical volume in response to the host computer's write access;
a data write unit for adding the data guarantee code to the data and writing the data to the storage device;
a second data guarantee code generator for generating a data guarantee code based on a second logical address designated by the host computer's read access when reading the data from the logical volume in response to the host computer's read access; and
a table that substitutes the first logical address for the second logical address;
wherein the second data guarantee code generator generates the data guarantee code based on the first logical address by referring to the table when the host computer reads the written data.

9. A method for controlling a storage sub-system comprising:
a storage device;
memory including a control program; and
a controller for controlling a host computer's access to the storage device to write/read data to/from the storage device in accordance with the control program;
wherein the storage sub-system controlling method comprises the steps executed by the controller of:
generating a data guarantee code according to an inherent attribute of the data;
adding the data guarantee code to the data and writing the data to the storage device;
checking the data guarantee code to judge whether the data is error-free or not when reading the data from the storage device;
storing, if there are first data and second data as the data and the content of the first data and the content of the second data are the same, the first data together with the data guarantee code in the storage device without storing the second data in the storage device;
associating the host computer's read access to the second data with the first data; and
changing an inherent attribute of the second data so that the data guarantee code generated when processing the host computer's read access to the second data matches the data guarantee code of the first data.

* * * * *